United States Patent
Ben-Cohen et al.

(10) Patent No.: US 12,301,960 B1
(45) Date of Patent: May 13, 2025

(54) LIVE BROADCAST PERSONALIZATION HIGHLIGHT GENERATOR

(71) Applicant: Amazon Technologies, Inc., Seattle, WA (US)

(72) Inventors: Avi Avraham Ben-Cohen, Holon (IL); Gilad Cohen, Jerusalem (IL); Elad Mezuman, Hod Ha-Sharon (IL); Yotam Elor, Raanana, NY (US); Lidor Burshtein, Holon (IL); Gal Shitrit, Netanya (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/424,040

(22) Filed: Jan. 26, 2024

(51) Int. Cl.
*H04N 21/8549* (2011.01)
(52) U.S. Cl.
CPC .............................. *H04N 21/8549* (2013.01)
(58) Field of Classification Search
CPC .................................................. H04N 21/8549
USPC ........................................................ 386/241
See application file for complete search history.

(56) References Cited

U.S. PATENT DOCUMENTS

| | | | | |
|---|---|---|---|---|
| 10,433,030 B2* | 10/2019 | Packard | ............ | H04N 21/23109 |
| 10,714,145 B2* | 7/2020 | Kulkarni | .............. | H04N 21/458 |
| 11,122,341 B1* | 9/2021 | Decrop | ............ | H04N 21/44008 |
| 11,425,469 B2* | 8/2022 | Trollope | ................ | G10L 15/26 |
| 11,664,053 B2* | 5/2023 | Raju | ...................... | G11B 27/34 |
| | | | | 386/248 |
| 11,670,085 B2* | 6/2023 | Verma | .................... | G06V 20/47 |
| | | | | 386/241 |
| 11,705,161 B2* | 7/2023 | Ebong | ..................... | G06V 20/49 |
| | | | | 386/241 |
| 11,830,241 B2* | 11/2023 | Merler | .................... | H04N 21/44 |
| 11,956,516 B2* | 4/2024 | Shichman | .............. | G11B 27/28 |
| 11,962,838 B2* | 4/2024 | Yelton | ................ | H04N 21/4821 |
| 2015/0110468 A1* | 4/2015 | Abecassis | .......... | H04N 21/4884 |
| | | | | 386/241 |
| 2023/0230378 A1* | 7/2023 | Rüfenacht | .............. | G06V 20/47 |
| | | | | 382/100 |
| 2023/0283878 A1* | 9/2023 | Huang | ............... | H04N 21/8549 |
| | | | | 348/207.11 |
| 2024/0314396 A1* | 9/2024 | Streater | ................ | H04N 21/435 |

* cited by examiner

*Primary Examiner* — Helen Shibru
(74) *Attorney, Agent, or Firm* — Knobbe, Martens, Olson & Bear, LLP

(57) ABSTRACT

The system utilizes a broadcast, an event time, and an indication time to accurately identify highlights within a live stream broadcast. The three times can be utilized to determine a start time of the highlight. The start time can be used to generate an interaction element to be displayed to a user. Upon interaction with the interaction element, the broadcast can be shown from the start time.

20 Claims, 6 Drawing Sheets

LIVE BROADCAST PERSONALIZATION HIGHLIGHT GENERATOR

BACKGROUND

Recently, media content in digital formats have become widely available via network accessible systems. For example, users can stream events as they are being broadcast for viewing on televisions, computers, mobile phones, and other such user devices. Such events can be segmented into identifiable moments for providing a concise summary of an event. Often, the summary includes the most interesting moments. Thus, a user may be able to re-watch the most interesting portions of the event or watch a portion of the event that the user initially missed.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
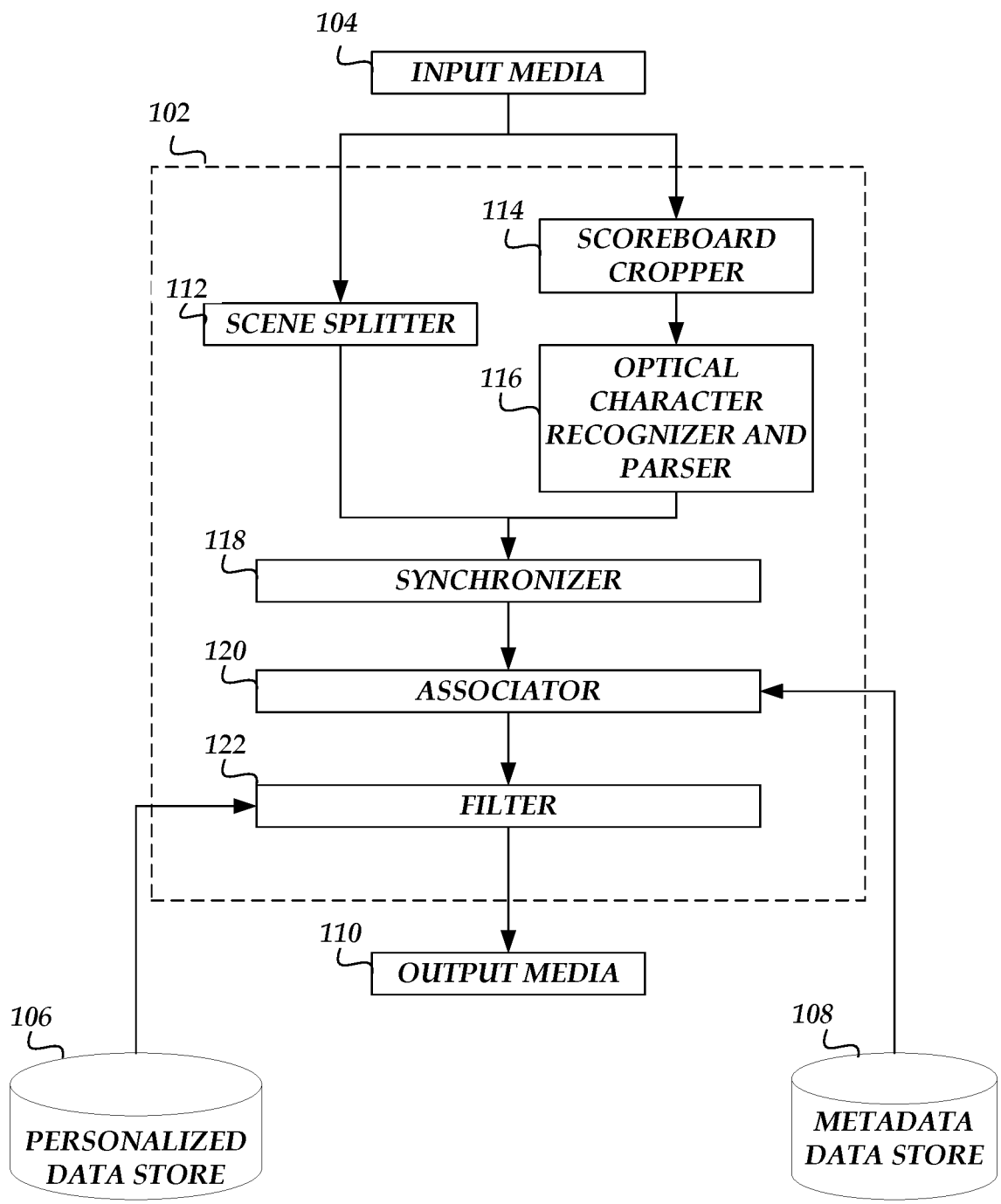
FIG. 1 is a block diagram of a personalized highlight creation system environment, according to one embodiment.

As described above, users can desire to watch an event that is currently streaming, or was previously streamed for viewing on televisions, computers, mobile phones, and other such user devices. In some cases, users may only wish to see key moments of the event. Often, a key moment is a moment that is universally agreed upon, such as a touchdown in American football or a game winning three-point shot in basketball. However, key moments may also be user specific. For example, a specific user may consider a key moment to include a play or action that involves a specific player or team. In some cases, a highlight reel, or identified highlights generated by a human after an event may contain the universally agreed upon key moments. As used herein, a "key moment" is not meant to be limited to moments that are important to the outcome of an event or that otherwise possess an inherent value over other moments. A key moment can be any moment that is of interest to a user.

However, the highlights generated by a human may fail to include all highlights a specific user may wish to see. In some cases, the user may be required to watch multiple highlight reels or even watch the entire event to see the highlights in which the user is specifically interested. Furthermore, the event may last three to four hours, and the highlight reel for the event may be upwards of 10 minutes long. A user may not wish to watch a video that long if the video includes highlights in which the user is not particularly interested. As a result, the user may be resigned to watching unsatisfactory highlight reels or devoting excess time in the pursuit of identifying key moments in which the user is interested. In such cases, excess computing resources may be consumed by the user device and/or the streaming system (e.g., excess network usage, excess processor utilization, excess memory usage, etc.) as the user watches the entire highlight reel or event, skips between different segments of a highlight reel or event, replays certain segments of a highlight reel or event, etc. in an attempt to find the key moments in which the user is interested.

To alleviate this issue, some conventional systems that broadcast events have an individual manually review the event broadcast and make determinations on what classifies as a key moment in the event broadcast. The individual may then assemble a highlight reel based on the determinations. In some cases, an event may be a sports broadcast in which a user may wish to view key plays only performed by a certain player. The user may wish to review a highlight nearly immediately after the key moments from that player occur or may wish to view the key moments of that player in a highlight reel following the game immediately after the broadcast concludes. An individual cannot generate all highlights a user may find to be a key moment in a clip that is an appropriate length for all user preferences. As a result, the user may search for a different highlight reel, may cancel the request to view highlight clips, turn off the broadcast, switch to another entertainment medium, and/or the like.

Highlights of, for example, a sporting event, can include many different moments. A highlight reel (also referred to herein as a moment reel) could include a clip of one or more of actions or plays (e.g., shots, personal fouls, technical fouls, injuries, remarkable plays, blocks, rebounds, etc. in a sporting event that is a basketball game). A personalized highlight reel (e.g., a collection of moments that is generated for an event from the event broadcast or a highlight reel specific to a user) that presents the moments a user wishes to see and omits others may be of interest to users. Individuals tasked with creating individual highlight reels, however, cannot create highlight reels that satisfy individual user requests in real-time or with the necessary scope. Thus, it may be desirable to provide a personalized highlight creation system and/or a live personalized highlight creation system that can, using video data, audio data, and/or metadata, interpret an event broadcast and/or highlight reels to provide users with personalized highlights and/or personalized highlight reels. In this way, the user would experience reduced time spent watching undesired moments and could customize their event broadcast viewing experience, and the amount of computing resources allocated to generating and serving the highlight reel may be reduced.

However, it may be difficult to identify the appropriate portion of an event broadcast that constitutes a moment that is a key highlight or prioritize key highlights to match a user's viewing time preferences. For example, an original, raw version of the event broadcast, such as a sporting event, may include multiple camera views, replays, and audio from commentors that span both the live action and a replay.

Thus, it may be difficult to identify the moment taking place, to identify the player that is the subject of the moment, to identify where the moment begins and ends within the timing of the broadcast, and to determine the moments in which a specific user may be interested. An individual watching the sporting event can logically decide when the moment is over and if the moment would be interesting to a user (as defined by criteria set by the user). There further exist video processing algorithms and systems (e.g., machine learning and computer vision systems) that can be trained to detect certain actions, such as a basketball entering into a hoop, a football being caught by a player in an endzone, a soccer ball passing a goal line, and/or any other action that constitutes scoring. However, machine learning and computer vision systems trained in conventional manners may be unable to determine specifically what content to include and not include in a moment. For example, for a basketball game, machine learning and computer vision systems trained in conventional manners may be unable to determine which player shot the basketball and caused the basketball to enter the hoop and if that shot would be interesting to a user with limited viewing time. Specifically, a player may make 20 shots in a game, and a user may not wish to see all 20 shots regardless of if that player is the user's favorite player.

Additionally, described herein is a personalized music clip creation system that utilizes a musical element extractor and an action spotting model to interpret audio data and/or video data to create a personalized music highlight reel. For example, a user may wish to create their own personalized highlight reel that includes a separate audio track (e.g., music selected by the user). Conventional software applications exist that allow a user to create the personalized music highlight reel. However, operating the conventional software applications may require a specialized skillset. In fact, to create a personalized music highlight reel using a conventional software application that is artistically set to music, an individual or team with a specialized skillset may manually (1) identify video clips to include in the highlight reel, (2) cut and arrange the video clips, (3) select appropriate music for the highlight reel and viewing audience, and (4) synchronize the selected music with the highlight reel (which may include overlaying a new audio track (e.g., the selected music) on an existing audio track of the highlight reel) to make a cohesive viewing experience. Given the skill required to accurately and stylistically synchronize the highlight reel and the music, typical stylized highlight reels generated by conventional software applications often include audio and video that are poorly synchronized (e.g., beats in the audio track may not correspond with specific actions being depicted in the video), audio with tempo or beats per minute that are not appropriate for the pace at which actions occur in the video, and/or the like.

Further, manual creation using a conventional software application may not prohibit clips or music from being selected. For example, certain music may have usage rights that restrict use of the music. An individual may not know when uploading an audio selection to the conventional software application that the individual or team does not have rights to use the uploaded audio. A clip may also include images within the background that would be undesirable to include in a personalized music highlight reel. Humans may be unable to detect such images or may miss them while focusing on the main aspects of a clip.

Highlight reels that are personalized to a user can be interesting to a user for catching up on a broadcasted event. Many users, such as sports fans, may further wish to create stylized highlight reels. In some cases, highlight reels may not be used to catch up on a game, but rather to share exciting moments of a game with their social media followers. Such users may wish to exchange or modify the audio of the highlight reel to include music that is timed with the key moments of the highlight reel. For such users, selecting music and lining up the music artistically with the key moments is cumbersome, time consuming, and potentially impossible without gaining technical editing skills or software. However, the personalized music clip creation system can overcome these technical issues in a number of ways. For example, the personalized music clip creation system can receive a request to create a personalized music highlight clip and can perform processes to select music, select personalized key moments, and align the music and personalized key moments to create a personalized music highlight clip. As another example, the personalized music clip creation system can splice together music and audio data of the personalized key moments to create a combined overlay that includes music and interesting audio data, such as an announcer's voice. Thus, even if a user is not technically skilled in the art of video and audio editing, a user may create a personalized music highlight clip.

The personalized highlight creation system also be configured as a live personalized highlight creation system that provides a technical benefit over conventional systems that may attempt to rely on broadcast time to determine when the key moment occurred during the event. For example, an event broadcast may be transmitted with metadata indicating a running broadcast time. The running broadcast time may begin at a first time, where the first time indicates the beginning of the event broadcast. An action (e.g., a touchdown, a goal, a homerun, etc.) may occur at a second time, where the second time is a time within the event broadcast in relation to the first time. A conventional system tasked with identifying a key moment may be unable to correctly identify, using only the broadcast time, when an action that is the subject of the moment occurred in comparison to other actions on the field. Without the ability to accurately identify a time of the subject action, the system may not be able to compare actions before and after the subject action that should be included as part of the moment, such as a pass to the receiver that scored the touchdown, a pass to a player that made a basket, a pitch to the player that hit the homerun, etc. The moment clip may then not include all relevant portions of the moment. The personalized highlight creation system described herein, however, can utilize identifiable characteristics within the event broadcast that can be used to adjust the system's understanding of the event time. For example, in American football, a snap of the ball begins play. The live personalized highlight creation system may recognize a snap of a football as the beginning of the moment in which a touchdown occurs and the next snap of the football (e.g., prior to an extra point or two-point conversion) as being the end of the moment (and optionally the beginning of a next moment). Using the broadcast time and the snap recognition to limit the broadcast data that may be important to the touchdown, the live personalized highlight creation system may return a highlight clip that includes all pertinent actions that form a moment.

Thus, described herein is a personalized highlight creation system that utilizes video data, audio data, and/or metadata to evaluate actions of an event broadcast or a highlight reel to generate a personalized highlight reel for a user. Specifically, the personalized highlight creation system can analyze the event broadcast to identify a full moment that is of interest to a specific user. A full moment may be a set of one or more individual actions that may be pertinent or relevant to the same incident or play and that collectively may be of interest to a user seeking to view a highlight clip of the incident or play. For example, a moment could be a three-point shot in a basketball game. The personalized highlight creation system can process the video data, audio data, and/or metadata to determine the three-point shot occurred and collect some or all individual actions for the three-point shot that comprise the three-point shot. For example, the actions for a three-point shot may include a pass, dribble, pass-fake, shot, and made basket. The personalized highlight creation system can analyze the video data and/or metadata to determine an accurate time of the three-point shot and the actions of the three-point shot within the event, highlight reel, and/or the event broadcast. Once identified, the portions of video data, audio data, and/or metadata can be analyzed to identify characteristics within the three-point shot. Characteristics may be data associated with the event that can be used to interpret the event, such as a name or position of an individual that performed an action, characteristics of an action, and/or the like. Actions can be characteristics or can include more than one characteristic performed by an individual. For example, an action can be a shot, block, foul, and/or the like. As another example, an action can be a basket, in which the characteristics can include a pass, shot, and ball entering the hoop.

Using the identified characteristics, provided metadata, and personalized metadata of the user, the moment can be filtered out and not included in a personalized highlight reel, or shown to the user. For example, if a first player makes a shot, the system may determine an identity of the player by analyzing the video and audio data. In some cases, a jersey of the player may not include a player's last name and may only include a number, such as #23, and a team, such as team "A." The personalized highlight creation system may use provided metadata to determine the player of team "A" that is associated with #23 is "M." The personalized highlight creation system may then use personalized metadata of the user to determine if the user desires to see three-point shots made by players on team "A" or by player "M." If the user metadata indicates the user would like to see that moment, the personalized highlight creation system may then add the moment to a personalized highlight reel or may highlight that moment on a live event broadcast.

The interactive event broadcast system may additionally review the audio to identify audio characteristics to identify characteristics of a moment. For example, a commentator may say a team name or a player name combined with the detection of the phrase "it's good" may indicate that player "M" made a shot of some kind. Further, processing the audio may allow for the determination of a natural beginning time and ending time for the clip such that the audio is not started or stopped in the middle of any commentary. Additional details of the interactive event broadcast system are described below with respect to FIGS. 1-6.

Example Personalized Highlight Creation System Environment

FIG. 1 is a block diagram of a personalized highlight creation system environment, according to one embodiment. As illustrated in FIG. 1, the personalized highlight creation system environment 100 includes a personalized highlight creator 102, an input media 104, a personalized metadata data store 106, a metadata data store 108, and output media 110. In an embodiment, the personalized highlight creator 102 includes image analysis components such as a scene splitter 112, a scoreboard cropper 114, an optical character recognizer and parser 116. The personalized highlight creator 102 further includes a synchronizer 118, an associator 120, and a filter 122. In some embodiments, the personalized highlight creator 102 is in communication with systems that facilitate the creating and distributing the input media 104 via networks and other communication channels. The input media 104 may be a broadcast feed or a highlight video and may be transmitted over satellite, a network, radio, airwaves, etc. and/or a combination thereof, each with transmission capabilities or accessed via ethernet, wi-fi, or through internal system processes to access downloaded input media 104.

The personalized highlight creator 102 may receive the input data 104 as video data, audio data, and/or metadata as a unit and/or as portions of the input media 104 that constitute moments. Each moment may be associated with moment metadata that may include event data, a broadcast time, and a play length, among other attributes. The event data may include interpretations of the event as processed (e.g., the number and name of the player(s) in the moment, the team scoring, etc.). The broadcast time may be the time within the event broadcast the moment occurs. The play length may represent a time it takes a media player to play the entire content of the media file at a normal speed (e.g., 1x speed).

The personalized highlight creator 102 can split the input media 104 into scenes using the scene splitter 112. The scene splitter 112 may detect individual moments by identifying, within the video feed and the audio feed of the input media 104, characteristics of the input media 104 that indicate a different moment. The characteristics, in some embodiments, may be a shift in a camera view, different players on the screen, completion of a previous moment, and/or the like. The characteristics can be used to trim the audio data and video data to separate moments.

In some embodiments, before, during, and/or in parallel to the scene splitter 112 processing the input media 104, the personalized highlight creator 102 can identify within the video data and the audio data a time indicator. For example, in a basketball broadcast or highlight reel, there may be a graphical overlay that indicates the scoreboard (e.g., a score bug). Using the scoreboard cropper 114, the personalized highlight creator 102 can identify within the video data where the graphical overlay may exist and/or where the time indicator may be present within the graphical overlay. To identify the scoreboard, the scoreboard cropper 114 may detect the edges of a shape within the video data that is in a stationary location within a frame and/or in a specific location within a frame (e.g., a bottom-right portion of the frame, a top-left portion of the frame, etc.). In some embodiments, the scoreboard cropper 114 can provide video data as an input to a machine learning model (which can include a neural network, a multimodal model, a large language model, a transformer model, etc.) that is trained to identify scoreboards or score bugs in video frames, where the machine learning model may output an indication of the pixels in a video frame at which a scoreboard or score bug is likely located in response to the input. In some embodiments, the scoreboard can be determined by parsing metadata to identify the pixels of a video frame in which the scoreboard is located.

In some embodiments, the time may be derived from audio data, such as audio of an announcer. The scoreboard cropper 114 may include a natural language processor that can be used to analyze natural language within audio data to determine a time. For example, a natural language processor may receive the audio data as an input, perform speech recognition on the audio data to generate a transcript, and parse the transcript to identify language in which time is mentioned (e.g., identify a commentator's voice saying, "With two minutes left to go in the half"). The natural language processor can process metadata regarding the event to determine the time structure of the event. For example, the metadata may indicate the length of time of a half, a quarter, a period, etc. In some embodiments, the scoreboard cropper 114 may identify the time within the scene of the event (e.g., from a shot clock sitting atop a basketball stanchion) rather than from an overlay like a score bug.

Using the identified time indicator, the optical character recognizer and parser 116 can parse through the identified time indicator from the scoreboard cropper 114 to recognize the indicated time. To recognize the time, the optical character recognizer and parser 116 may utilize lexicographic information to identify numbers from a scoreboard on the video data or language within the audio data. The identified time of the optical character recognizer and parser 116 may be stored as metadata for the input media 104. The optical character recognizer and parser 116 or other components such as the synchronizer 118 can use the identified time to analyze the event or moments of the event to accurately track the time of the moments. For example, a highlight reel provided as input media 104 may include a sequence of pass assists and their resulting successful shots. The highlight reel may have an associated time that can be used to identify when the shot is made in relation to the start of the highlight reel, or can be used to indicate when the shot is made in relation to the start of the scene. However, additional images may be included in the highlight reel between the assist, the resulting shot, and the ball entering the basket. For example, a highlight may show a pass, a shot, and then may include an artistically inserted image of the crowd anticipating the shot before showing the ball entering the basket. Using only the event time, the personalized highlight creator 102 may be inaccurate in determining the highlight from the highlight reel without the artistic addition. However, using the scoreboard or other timing indicator, the personalized highlight creator 102 may identify the time of the assist, the time of the shot, and the time of the basketball entering the hoop as being sequential in time. The personalized highlight creator 102 may then be able to identify the highlight sequence without other insertions. Further examples may include the ability to detect commercials, replays, and/or the like.

Using the indicated time identified by the optical character recognizer and parser 116, the personalized highlight creator 102 can synchronize the scene using the synchronizer 118 with a clock to accurately track the actions within the scene identified by the scene splitter 112 using the identified time from the optical character recognizer and parser 116. Each scene from the scene splitter 112 can include the metadata that indicates the input media time. The optical character recognizer and parser 116 can provide the identified time and associated input media time. The synchronizer 118 can use the identified time and the associated input media time and the input media time associated with each scene to synchronize the scene with the identified times. For example, a scene may be provided by the scene splitter 112 that includes a shot assist, a shot, a crowd reaction, and a basketball entering a hoop. The scene may be indicated as starting at a first input media time and ending at a second input media time. The optical character recognizer and parser 116 may provide one or more identified times associated with input media times between the first input media time and the second input media time. The synchronizer 118 can synchronize the identified times with the scene to generate synchronized scenes.

The personalized highlight creator 102 can use an associator 120 to associate the synchronized scenes with association metadata from the metadata data store 108 to create and interpret a highlight. The associator 120 can utilize the identified times of the synchronized scenes to identify a highlight. A highlight may be the moment of the event that is an exciting play or action (e.g., a play or action that changed the score of a game or prevented the score from changing). For example, a highlight may be an assist, shot, and resulting basket. Using the example above, the highlight would not include the crowd reaction of the scene. Using the identified times, the associator 120 may arrange portions of a scene that align with the identified times.

In some cases, the associator 120 may interpret a synchronized scene by utilizing association metadata from the metadata data store 108. The metadata for the scene may include, for example, action types, player names, player numbers, team names, statistics, and/or the like. The associator 120 may utilize the metadata to examine the highlights within the scene to determine facts about the highlights. For example, in a highlight that includes an assist, shot, and resulting basket, the associator 120 may determine, using the metadata, that there was an assist that was completed by a first player and there was a shot that was executed by a second player and may determine the name of the first player and the second player.

In some embodiments, the associator 120 may review audio data, video data, and/or media of the highlight and/or the scene to identify characteristics. In some embodiments the associator 120 may receive characteristics from the scene splitter 112 and/or other components of the personalized highlight creator 102. Using the received characteristics, the associator 120 may associate the characteristics with association metadata from the metadata data store 108. For example, if the associator 120 receives a characteristic for a scene that indicates the shot is made by player #23, the associator 120 may determine, using the metadata, that player #23 is player "M." The associator 120 can provide the highlights and associated metadata to the filter 122.

The filter 122 of the personalized highlight creator 102 may be configured to receive highlights and associated metadata from the associator 120 and personalized metadata from a personalized metadata data store 106. Using the personalized metadata and the highlights and associated metadata, the filter 122 can determine criteria. The criteria can be determined using the personalized metadata. For example, a criterion may be that a highlight includes a specific player, a specific action, or happens within a time of the event. The personalized metadata used to determine the criterion can be requested from a user, supplied by a user, or determined for a user. In some cases, personalized metadata can be collected at a user interface of a user device that asks for user preferences. In some cases, the personalized metadata can be learned from user actions or from other user sources, such as a fantasy sports league social media or purchase history. In some cases, personalization metadata can be derived based on characteristics of the user such as geographic location.

Using the criteria, the filter 122 can determine which highlights satisfy the criteria and should be included in the output media 110. In some cases, a highlight may not satisfy any criteria and may be prevented from being included in the output media 110. For example, if a criterion is determined that a user only wishes to see actions performed by player "M," the filter 122 can review the highlights provided by the associator 120 and, by examining the metadata, can determine whether each highlight includes player M. A first highlight may include player M according to the metadata and second highlight may not include player M according to the metadata. The filter 122 may then include the first highlight in the output media 110 and may filter out the second highlight.

In some embodiments, personalized metadata may include a desired time limit on the output media 110. For example, a user associated with the personalized metadata may only wish to see output media 110 that lasts three minutes or less. The filter 122 may identify a criterion based on the time limit. To comply with the criterion, the filter 122 may identify all highlights provided by the associator 120 that could be included in the output media 110 according to all other criteria. The filter 122 may then determine if the complying highlights would extend longer than 3 minutes if played in an order. Upon the determination that the complying highlights would extend longer than three minutes, the filter 122 may select highlights to exclude based on a prioritization scheme. The prioritization scheme may include using personalized metadata to determine which highlights can be prioritized for the user. For example, a user may prioritize three-point shots over two-point shots. The filter 122 can then rank the scenes that include three-point shots and two-point shots and prioritize including the three-point shots in the output media 110. In some cases, the filter 122 may use a complex prioritization scheme which uses multiple points of personalized metadata to create a hierarchy of highlights. The filter 122 can then determine the number of highlights that can be included in the output media 110 and still comply with the three-minute criterion. In some embodiments, the filter 122 may access additional metadata to create a prioritization scheme. For example, the filter 122 may access additional metadata that indicates one highlight was more impactful on the game than other using websites and/or the like.

The resulting output media 110 may be a media representation that is output to the user, output to a network site (e.g., a website) or other method of distribution, or may be stored in a data store. In some embodiments the data stores can be part of the personalized highlight creator 102 or can be separate.

It should be appreciated the input media 104 of the event broadcast is described herein as being a basketball game for illustrative purposes and ease of explanation, but this is not meant to be limiting. For example, the input media 104 can be other sporting and non-sporting events that include identifiable moments that can be extracted from video data and audio data of a broadcast. The functionality described herein can be performed on event broadcasts that depict different types of highlight reels recorded input media 104, including sporting events (e.g., American football, soccer, baseball, ice hockey, soccer, tennis, golf, etc.), concerts, game shows, awards shows, news broadcasts, political debates, etc. Further, it should be appreciated that an event may not be limited to a continuous activity. In some cases, an event may consist of multiple discrete games, matches, plays, episodes, or other types of occurrences, such as partial or complete seasons of a sport.

Example Block Diagram for a Live Personalized Highlight Creation System

Figure 2:
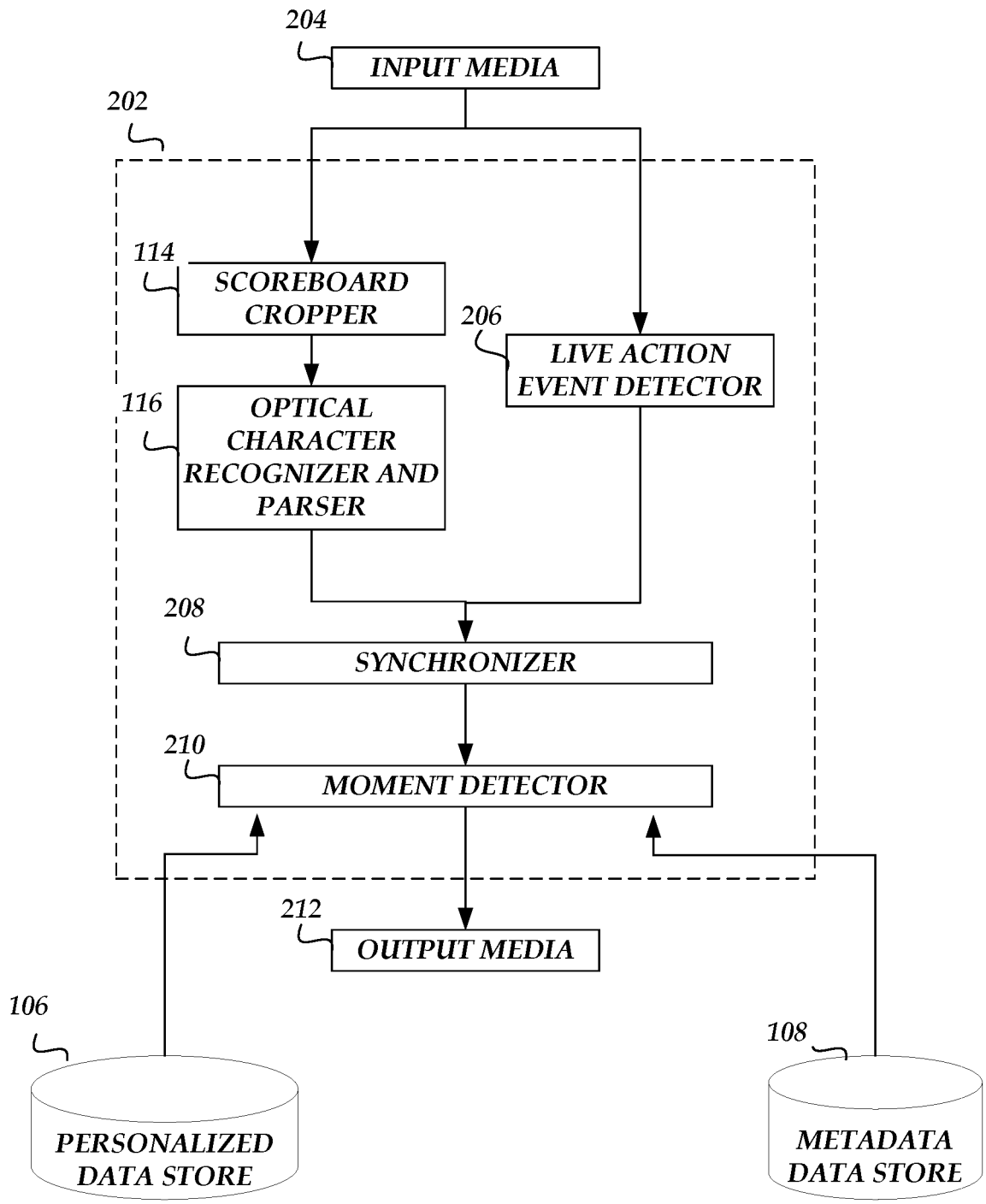
FIG. 2 is a block diagram of a live personalized highlight creation system environment illustrating the operations performed by the components of the personalized highlight creation system environment of FIG. 1 to receive and interpret live event broadcast data for creating personalized highlights, according to one embodiment.

FIG. 2 is a block diagram of a live personalized highlight creation system environment 200 illustrating the operations performed by the components of the personalized highlight creation system environment of FIG. 1 to receive and interpret live event broadcast data 204 for creating personalized highlights, according to one embodiment. As illustrated in FIG. 2, the input media 204 is provided as a live event broadcast. The input media 204 may be a broadcast feed and may be transmitted over satellite, a network, radio, airwaves, etc. and/or a combination thereof. The input media 204 may be received at a live personalized highlight creator 202. The input media 204 may be processed by a scoreboard cropper 114 and an optical character recognizer and parser 116 as described in FIG. 1. The input media 204 may in parallel, or in sequence, by processed by a live action event detector 206. The live action event detector 206 can be configured to process audio data, video data, and/or metadata of the input media 204 to determine an inciting action within the event broadcast. An inciting action may indicate an action within the event that can be used as an indicator for the start of action within the event. For example, in American football, the snap of the football begins a play. The live action event detector 206 may analyze the video data of the input media 204 to detect the inciting action as a snap of the football. The live action event detector 206 may identify a broadcast time of the inciting action and store the broadcast time and associated inciting action as metadata. In some examples, the inciting action may be the beginning notes to a song in a concert broadcast, a moderator asking a question in a debate, a face off in hockey, and/or the like.

To detect an inciting action, the live action event detector 206 may use video and audio processing to review video and audio data. For example, the live action event detector 206 may use pixels, camera angles, object detection, commentator audio, player vocalizations and the like to identify when action begins. For example, the live action event detector 206 can perform object detection based on pixels in a video frame of the video data. The live action event detector 206 may detect different types of objects, such as players, balls, referees, basketball hoops, soccer or hockey goals, and/or the like. Once various objects are detected, the live action event detector 206 can compare different, successive video frames to identify movement or lack of movement of the detected objects. Such movement or lack of movement may indicate the beginning of an action. As an illustrative example, the live action event detector 206 may detect a football and/or one or more players across multiple video frames. If the live action event detector 206 determines that the football and/or player(s) remain stationary for a threshold period of time followed by some or all of the players moving and/or the football traveling in a certain direction (e.g., to the left or upper left of the video frames) within a threshold amount of time (e.g., 1 millisecond, 1 second, etc.), then the live action event detector 206 may determine that an action that involves the snap of a football has occurred. Similar approaches could be implemented by the live action event detector 206 to identify a face off in a hockey match, a strikeout by a pitcher in a baseball game, the opening of gates in a horse race, and/or the like. Similarly, the live action event detector 206 can train and use a machine learning model to identify actions within the video and audio data. For example, the live action event detector 206 may train a machine learning model using training data that includes video clips labeled with an action depicted therein and/or labeled with a time at which the action began. Once trained, the live action event detector 206 can provide one or more video frames as an input to the trained machine learning model, and the trained machine learning model may output an indication of an action detected in the video frame(s) and/or a time at which the action began.

In some embodiments, the video and audio data can be processed using a machine learning model that is trained to identify the inciting action. The machine learning model can be trained using training data that identifies the inciting action or actions within an event. The machine learning model may output an indication of detection of the inciting action.

The synchronizer 208 of the live personalized highlight creator 202 can use the identified time of the optical character recognizer and parser 116, the live action event detector 206, and/or the broadcast time to synchronize the input media 204 with a clock usable by the live personalized highlight creator 202. Using one or more of the times, the live personalized highlight creator 202 can more accurately identify live highlights to provide to a user. For example, the identified time can be continuously identified throughout the broadcast. However, game clocks and display clocks are subject to human error. For example, in an American football game, a clock may be started at the beginning of a play. However, that relies on a person or machine to start the clock with the play, which may or may not always happen in a timely manner. Additionally, after the snap of a football, the clock, which may have been accurately started, may not transition to display the next number immediately, and instead may have a 1-2 second delay before indicating a change in the clock. Relying only on the identified time may result in essential actions from being considered as actions.

The live action event detector 206, may involve processing audio data and/or video data to adequately make the determination an inciting action has occurred. The time it takes to process the audio data and video data and determine there is an inciting action may be longer than to identify a time on the video data. Additionally, not all action begins with an inciting action according to the live action event detector 206 or an inciting action may not be captured by the audio data or the video data. For example, a play in American football may begin with a kick-off rather than a snap of a ball. In another example, the broadcast may return to a game after a commercial occurs in the middle of a play.

The synchronizer 208 can use the identified time and the inciting action time to enable creation of a highlight. In some cases, the synchronizer 208 can continuously synchronize data as it is received and provide the data to the moment detector 210. As the synchronizer 208 receives additional data, it can update the moment detector 210. For example, the identified time may be received for an associated broadcast time. The synchronizer 208 may synchronize the times and provide the times to the moment detector 210. The time of the inciting action may be received after the associated times have been provided to the moment detector 210. The synchronizer 208 may synchronize all three times and update the moment detector 210.

The moment detector 210 may use the one or more times to identify actions that constitute highlights. Each additional time provided may be used to create a highlight clip. For example, after receiving the identified time associated with the broadcast time, the moment detector 210 may begin identifying actions based on the times. Once the moment detector 210 receives the time of the inciting action, the moment detector 210 may adjust any created highlight clips to more accurately capture a full highlight. For example, the moment detector 210 may identify a touchdown and may use the identified times to determine when the clock started prior to the touchdown and begin to make a highlight clip beginning at that time. Upon receipt of an inciting action near the time of the identified time of the clock restarting, the moment detector 210 may adjust the beginning of the highlight clip to start earlier to capture the beginning of the play. Determining if the inciting action time is near the identified time may include a time comparison between the inciting action and the identified time. To ensure the inciting action and the identified time are indicating the same inciting action, the moment detector 210 may have a threshold for the time difference. The threshold may be event specific. For example, the time between when the clock starts on a display after the snap of a football and the actual snap may be within 1-2 seconds and an appropriate threshold may be 2 seconds. In an event such as basketball, the inciting action may be less clear, and a longer threshold may be required to track that the inciting action is the action indicated by the detected event time.

To identify a highlight for a highlight clip, the moment detector 210 may access personalized metadata from a personalized data store 106 and association metadata from a metadata data store 108 as described in FIG. 1. As in FIG. 1, the personalized metadata and metadata can be used to determine which moments are highlights to output as output media 212. In some embodiments, the moment detector 210 may utilize additional components such as an action spotting model, video and audio detectors, and/or the like to identify moments that constitute highlights.

In some embodiments, the output media 212, can include a marker on a live stream broadcast indicator, which provides a viewer with information regarding the action within the highlight and allows the user to accurately jump to the beginning of the highlight. For example, a highlight may be a touchdown and may be indicated on a broadcast progress bar where the touchdown highlight begins. By interacting with, for example, an interaction element on the progress bar, the user may jump to the portion of the broadcast in which the football was snapped, beginning the touchdown play.

Example Block Diagram for a Personalized Music Clip Creation System

Figure 3:
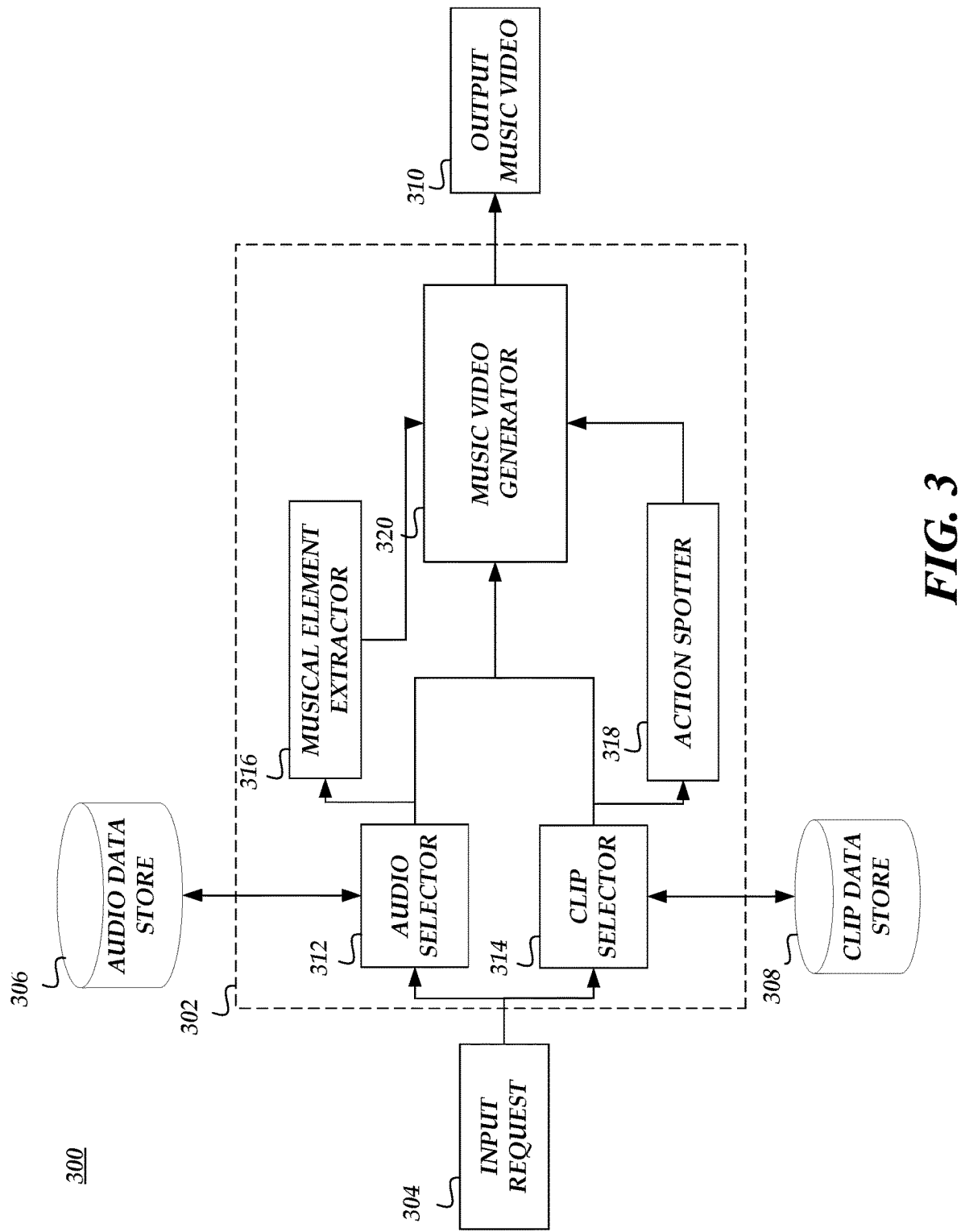
FIG. 3 is a block diagram of a personalized music clip creation system using the output media of the personalized highlight creation system of FIG. 1, according to one embodiment.

FIG. 3 is a block diagram of a personalized music clip creation system environment 300 using the output media 110 or 212 of the personalized highlight creation system of FIG. 1 or the live personalized highlight creation system of FIG. 2, according to one embodiment. personalized music clip creation system environment 300 includes an input request 304, personalized music clip creator 302, audio data store 306, clip data store 308, and output music video 310. The input request 304 can include a request initiated by a user. The input request 304 can include one or more of a speech stream, typing in natural language, manual commands and/or the like. In some embodiments the speech stream may be input via an audio recording device such as a microphone in which, for example, natural language processor may be used to translate the audio speech to text. The speech to text translation can be done using automatic speech recognition (ASR) using APIs, open-source engines, and/or through machine learning speech to text translators. In some embodiments, the input request 304 may be input using a text input device such as a keyboard to create typing in natural language. In some embodiments, the input request 304 could be completed using a list of options provided to the user to select at an input device using manual commands. The natural language processor may be used to interpret the selected options to determine what should be retrieved from the audio data store 306 and the clip data store 308. For example, a user may request, "Prepare a player "M" music highlight video from the "A" vs. "B"basketball game."

The input request 304 may be received by the personalized music clip creator 302. The personalized music clip creator 302 may include an audio selector 312, clip selector 314, a musical element extractor 316, an action spotter 318, and a music video generator 320. In some embodiments, the input request 304 can be received at the audio selector 312 and the clip selector 314. The audio selector 312 can be configured to determine an appropriate audio or may be configured to retrieve an audio based on the input request 304 and retrieve the audio from the audio data store 306.

To determine an appropriate audio, the audio selector 312 may use learned data about the user, the event, the type of highlights requested, trending audio on social media (e.g., web data), and/or the like. For example, the audio selector 312 may determine audio that the audio selector 312 has determined the user would prefer using past data or by accessing, for example, personalized metadata data store 106 of FIG. 1. In some cases, the audio selector 312 can store or retrieve information regarding audio options and can evaluate if an audio option would match with an event or highlight type. For example, the audio selector 312 may have data that indicates a first song is a pop song sung by a teen artist and a second song is a pop/rap song that is often played in sporting arenas. If the input request 304 indicates the event is a basketball game, the audio selector 312 may determine the second song is more appropriate for the event and may retrieve the second song from the audio data store 306. If the input request 304 indicates the event is an international gymnastics meet, the audio selector 312 may determine the first song is more appropriate than the second song and may retrieve the first song from the audio data store 306. In some cases, the audio selector 312 may not have enough information on songs or the potential highlights and may request additional information from the audio data store 306 and other components of the personalized music clip creator 302 to select appropriate audio. In some cases, the audio selector 312 may use additional data to select audio from the audio data store 306. For example, the audio selector 312 may consider data rights, language used within the audio, tempo, pulse, dynamics, and artist information to select appropriate audio to fulfill the input request 304. The audio selector 312 may provide the selected audio or an indication of the selected audio to a musical element extractor 316 and a music video generator 320. In some cases, the input request 304 can include a song to be used. The audio selector 312 may retrieve the song and provide it or may determine if the song is retrievable based on additional data such as data rights and language. Further, the audio selector 312 can be trained using a training set to determine audio should be selected.

The clip selector 314 can be configured to determine an appropriate clip based on the input request 304 and retrieve the audio from the audio data store 306. In some embodiments, to determine what clips to include in a highlight reel for the music video, the clip selector 314 may select clips based on metadata, personalized metadata, and/or the action of the clip, e.g., all baskets, chronologically, by player, or by rankings. As described above, the filter 122 of FIG. 1 can utilize personalized metadata and metadata to help rank the clips. The clip selector 314 may rely on the filter 122 or may use the same or similar data to create a new ranking. For example, the clip selector 314 may include the action, identified time, key players within the clip, personal preference data, etc. Further, the clip selector 314 can be trained using a training set to determine which clips should be ranked higher than others. Training can include training the clip selector 314 to identify actions that are popularly included in music videos. The clip selector 314 may be trained to identify personal preferences of the user to select clips. Training the clip selector 314 may be understood to mean that personalized music clip creator 302, or an external component, trains a machine learning model used by the clip selector 314 in the process of selecting clips based on the input request 304. For example, once the machine learning model is trained, the clip selector 314 can provide user information, input request 304 information, and external data as input(s) to the trained machine learning model to identify clips to select. Training the model may include training based on a data set that includes music highlight reels, online videos, event data, and music data, and then testing to determine the desirability of certain audio clips over others for generating a personalized music clip. The clip selector 314 may then determine an order to combine the ranked moments. The clip selector 314 may determine an optimal length of a video and only provide clips that, when combined, can comply with the optimal length, or can determine a time limit based on personal preference or other metadata, such as social media video length limits. The clip selector 314, can provide the selected clips to an action spotting model 318 and the music video generator 320.

The musical element extractor 316 can be used to analyze audio data of the selected audio and map the elements of the song. Song elements may include, but are not limited to, pulse, tempo, beat, dynamics, lyrical moments, and the like. The musical element extractor 316 can map the audio and create metadata. In some embodiments, the audio data store 306 may include all relevant metadata and audio mapping such that the musical element extractor 316 is not necessary for creating the music video.

In some cases, the musical element extractor 316 can extract audio elements from the clips selected by the clip selector 314. For example, the musical element extractor 316 can identify crowd excitement or comments from a commentator that may be included in a music video by the music video generator 320. The musical element extractor 316 can be trained using a training set to determine which audio, if any, from the clip should be included in the final music video.

The action spotter 318 can be used to identify characteristics within the clips. The action spotter 318 can use visual characteristics and/or audio characteristics and machine learning training to detect actions. The action spotter 318 can utilize a machine learning model trained by the action spotter 318 to predict a moment based on the visual characteristics and/or audio characteristics that indicate actions of the event within a clip. For example, the machine learning model may be trained by the action spotter 318 or another component (not shown) using training data that includes various clips (e.g., video data portions) each with one or more labeled characteristics and/or actions (e.g., where the video data portion includes an action such as a shot, a basket, a pass, etc.). The action spotter 318 may be trained to identify key moments within the clip. For example, in a clip that depicts a three-point shot, the ball entering the basket may be the key moment or the player jumping and releasing the ball may be the key moment. The time of the key moment may be provided to the music video generator 320.

The music video generator 320 may be used to combine the selected audio, such as a song, with the clips. In some cases, the music video generator 320 may order the clips in an arrangement to match the audio. The music video generator 320 can utilize a machine learning model to determine an artistic or preferred arrangement based on the key moments and musical elements. For example, the machine learning model may be trained to arrange and/or align a key moment with an audio track based on the visual characteristics and/or audio characteristics that indicate matching points of interest within the key moment and the audio track. The machine learning model may be trained using a training set that includes music videos and/or their underlying highlight clips, audio maps, audio elements, and/or metadata to align the key moment and a musical element. For example, the machine learning model could learn that a key moment should be aligned with a beat of the audio track based on the training set. In some embodiments, the music video generator 320 may shorten the clips or the audio for the arrangement. In some embodiments, the music video generator 320 may substitute or overlay clip audio over the selected audio and certain points.

The music video generator 320 may use video data and audio data that is not part of any clip in the video clip data store 308 to create a more cohesive and/or artistic music video. For example, the music video generator 320 may determine a first clip of a first length is to be first and the key moment within the first clip should align with a beat. The music video generator 320 may determine a second clip of a second length is to be second and the key moment within the second clip should align with a beat. In some cases, the lengths of the first clip and the second clip may prevent the clips from being played back-to-back while aligning the key moments with beats. In such cases, the music video generator 320 may determine an additional clip, such as a transition clip, should be inserted between the clips for alignment purposes. By including the additional data, the music video generator 320 can create a better arranged and/or aligned music video. In some cases, the music video generator 320 may select the transition clip based on a length of the transition clip and/or cut the transition clip such that, when the transition clip is inserted between two highlight clips, the length of time between the key moment within the first clip and the key moment within the second clip matches the time between successive or non-successive beats in the audio track. The music video generator 320 can provide the music video as an output music video 310 to be shown to a user, stored, and/or the like. The output music video 310 can be formatted as an MP4, WMV, MPEG, MOV, etc. The music video generator 320 may be configured to format the output music video 310 into a specific format prior to output.

Example Illustration of Music Video Alignment

Figure 4:
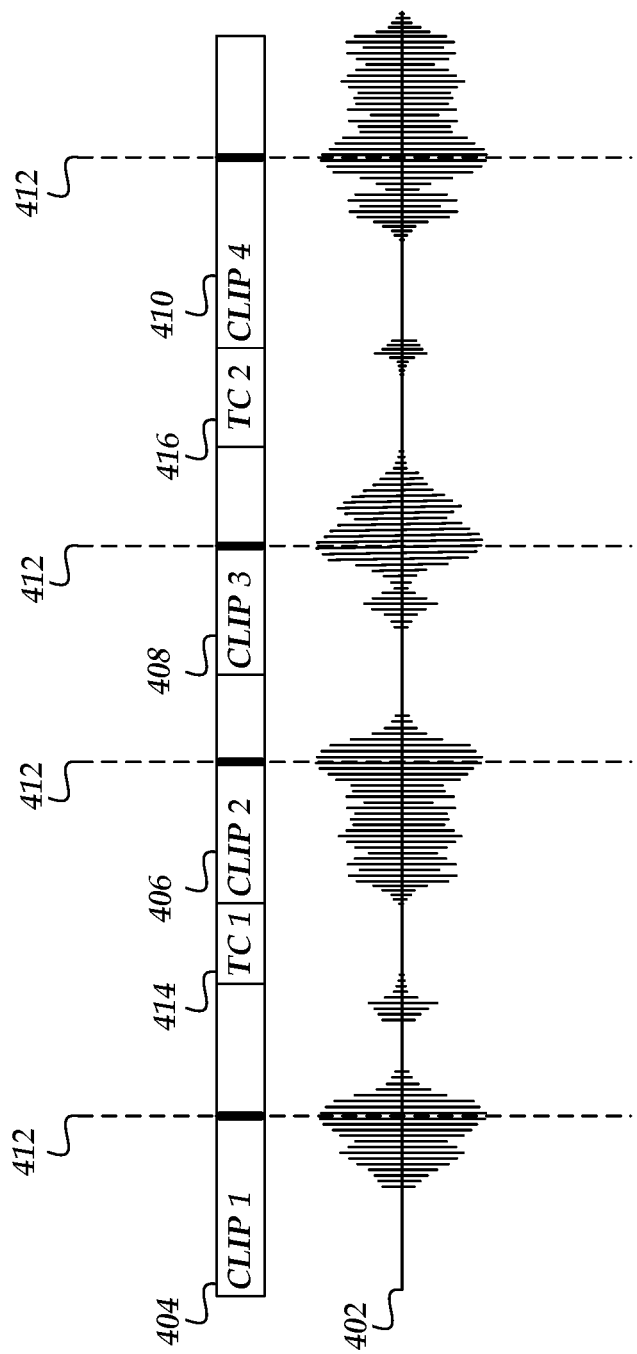
FIG. 4 is an illustration of the personalized music clip creation system of FIG. 3 aligning audio data with highlight data, according to one embodiment.

FIG. 4 is an illustration of the personalized music clip creation system of FIG. 3 aligning audio data with highlight data, according to one embodiment. An illustrative audio map 402 generated by the musical element extractor 316 of FIG. 3. It should be appreciated that the audio map 402 is a visual representation of audio. The musical element extractor 316 may generate metadata in other forms for use by the music video generator 320. The amplitude of the audio map 402 may indicate elements of music, such as silence or a beat. For example, the wider portions, or the higher amplitude, of the audio map 402 may indicate a beat or loud moment of the audio and the portions lacking amplitude may indicate silence within the audio.

The music video generator 320 may receive four clips, clip 1 404, clip 2 406, clip 3 408, and clip 4 410. Each clip may have a key moment 412 within the clip identified by the action spotter 318. The key moment may be the action within the clip that is the critical or defining moment of the clip. For example, the key moment in a three-point shot clip could be the ball entering the basket or the shot leaving the player's hands. The music video generator 320 may determine the order for the clips as depicted. The key moments 412 may be aligned with the beats or loud moments within the audio map 402. Aligning the clips with the audio map 402 may leave moments of audio without a corresponding clip. In some embodiments, the music video generator 320 can remove portions of the audio. In some embodiments, the music video generator 320 can access additional clips, or transition clips (TC) such as TC 1 414 and TC 2 416 specifically selected to match the clips. For example, all clips may be of player 1. TC 1 414 may show player 1 expressing excitement and TC 2 416 may show a crowd with a sign about player 1. TC 1 414 and TC 2 416 may further be selected for being the proper length to fit in the space between the clips 404, 406, 408, and/or 410 to ensure that actions and audio track characteristics are synchronized.

Example Music Video Creation Routine

Figure 5:
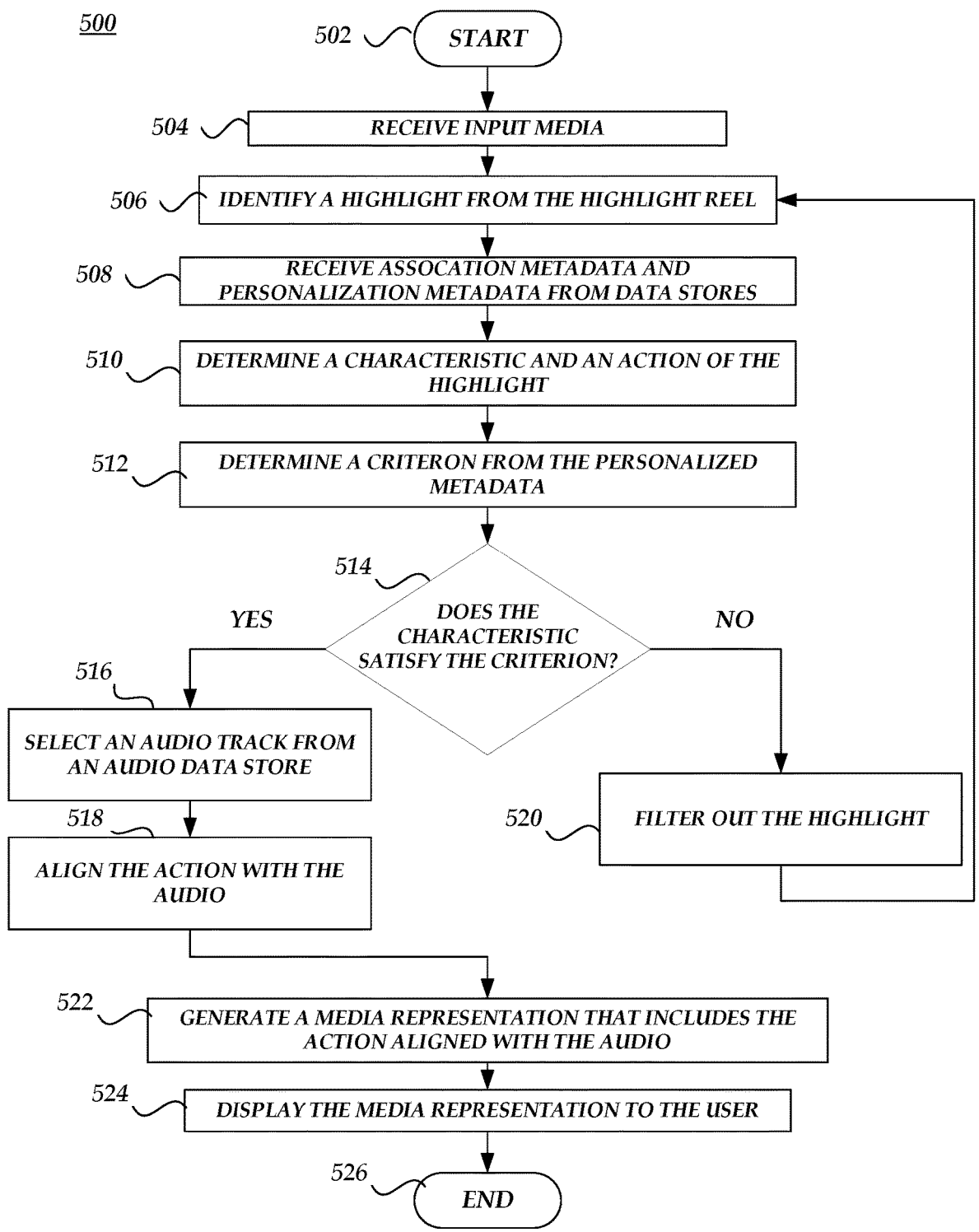
FIG. 5 is a flow diagram depicting a routine for collecting and interpreting highlight data for a personalized music clip according to the personalized music clip creation system of FIG. 2, according to one embodiment.

FIG. 5 is a flow diagram depicting a music video creation routine 500 illustratively implemented by the personalized highlight creation system 102 of FIG. 1 and/or the personalized music clip creation system 302 of FIG. 3, according to one embodiment. The music video creation routine 500 begins at block 502.

At block 504, input media for an event is received. Input media can be, for example, a highlight reel or a broadcast. In some cases, the input media, such as a highlight reel, can be received from a secondary source, uploaded by a user, generated as the broadcast is ongoing, a highlight reel generated by Amazon™, etc. Highlights are extracted from the input media at block 506. Highlights can be clips that contain a key action and associated actions. For example, the highlight can include an action that is a key action such as a three-point shot, and the actions leading up to the shot.

At block 508, the personalized highlight creation system 102 can receive association metadata from a metadata data store 108 and personalization data from a personalization data store 106. The personalization data can be data for a user and the association metadata can be metadata associated with the event of the input media.

At block 510, the personalized highlight creation system 102 can determine characteristics and/or actions that are identified from audio data and video data from the event broadcast. For example, characteristics can be a player on the screen, a team, etc. An action can be, for example, a shot, touchdown, homerun, etc.

The personalized highlight creation system 102 can determine, at block 512 a criterion using the personalization metadata. A criterion can be a user preference that indicates characteristics the user desires to be included in output media 110 or 212. For example, a user may only wish to see a highlight of a first player.

The criterion is used at block 514 to determine if the highlight would satisfy the criterion. Upon the determination that highlight would satisfy the criterion, the music video creation routine 500 can proceed to block 516 to be included in a highlight music reel and the personalized music clip creation system 302 selects an audio track. If more than one highlight of the input media would satisfy the criterion, the highlights are combined into a reel and presented to the user without aligning the highlight reel with music.

In some embodiments, the highlight reel can be aligned with the selected audio. Audio selection can include using personalization data, metadata, or network data that indicates community preferences to identify an audio track that would artistically match a highlight reel created using the satisfactory highlights. Selecting an audio track may consider audio elements such as beats, tempo, lyrics, and/or dynamics in selecting the music. The audio elements may further be identified by audio analysis or through metadata. If the highlight would not satisfy the criterion, the music video creation routine 500 proceeds to block 520 and the highlight is filtered. Then routine 500 may then proceed to block 526 and end or revert back to block 506 for analyzing another highlight in the highlight reel.

The audio and the highlight are aligned at block 518. The audio elements that were determined can be used in combination with the action to create a highlight that artistically meshes with the audio. Audio may be cut or spliced to ensure proper alignment. Further, multiple audio tracks may be selected. For example, a first audio may be a song, and a second audio may be commentary from the highlight. The audio tracks and the highlight could be aligned to best create a cohesive music video.

At block 522, a media representation, such as an mp4 file, could be generated using the aligned highlight and audio. The media representation can be displayed to the user at block 524. The routine 500 ends at block 526.

Example Live Personalized Highlight Clock Sync Routine

Figure 6:
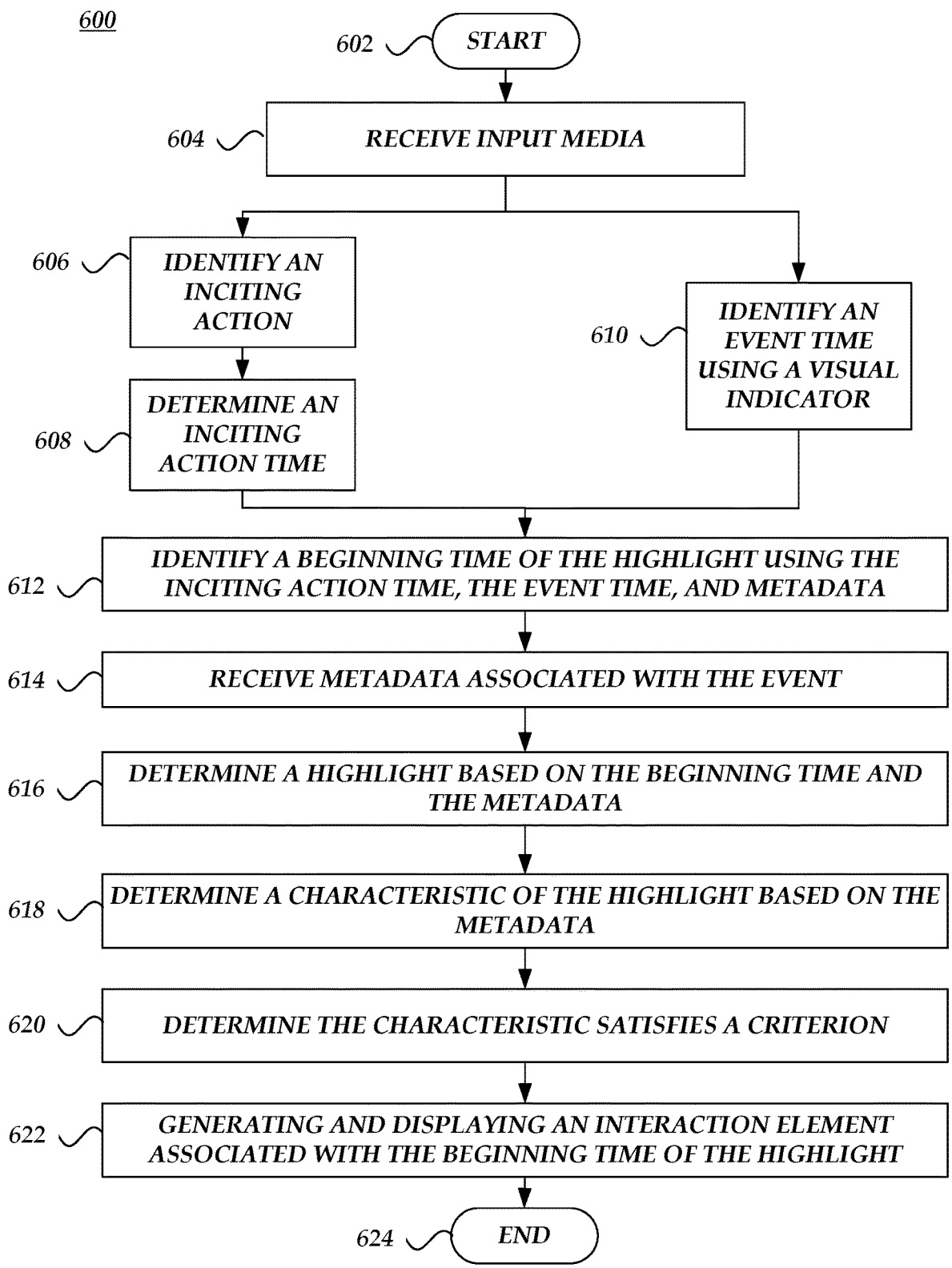
FIG. 6 is a flow diagram depicting a routine for collecting and interpreting live data for personalized live highlight identification and creation illustratively implemented by the live personalized highlight creation system environment of FIG. 3, according to one embodiment.

FIG. 6 is a flow diagram depicting a live personalized highlight clock sync routine 600 illustratively implemented by the live personalized highlight creation system 202 of FIG. 2, according to one embodiment. The live personalized highlight clock sync routine 600 begins at block 602.

At block 604, an input media 204 for an event is received. Input media 204 can be a broadcast stream of a live event broadcast. The input media 204 can include audio data, video data, and/or metadata for the event. The input media 204, at block 606 can be processed to identify an inciting action. An inciting action is an action of the event that begins what could be a highlight. For example, in American football, an inciting action may be a snap of the football that begins a play. The inciting action can be identified by a live action event detector 206 of FIG. 2. At block 608, the live personalized highlight creation system 202 can identify a time of the broadcast that corresponds with the time of the inciting action.

At block 610, the live personalized highlight creation system 202 can identify an event time using a visual indicator. An event time may be a time as tracked within the event, for example a shot clock or game clock. The visual indicator can be a scoreboard overlay on the video data added after capture of the event and transmitted as part of the video data for visualization by a viewer of the event. The scoreboard can be detected and interpreted to determine an event time using a scoreboard cropper 114 and/or an optical character recognizer and parser 116. In some embodiments, the live personalized highlight creation system 202 can identify an audio indicator that indicates an event time.

Using both the event time and the inciting action time, at block 612 the beginning time of a potential highlight can be calculated or identified. The time can further be determined using metadata to identify characteristics of the audio data or the video data. The combination of the times and metadata can help identify an accurate action time. An action time is the time the action of a highlight begins. In some embodiments, the inciting action time may be identified using an action that indicates the end of a highlight. For example, an action may be a touchdown. The highlight can then be determined to have started at a time prior to the action using, for example metadata. In some cases, using the highlight as an inciting action time, may include a generalized knowledge regarding the length of a highlight clip associated with that highlight. For example, an inciting action that is a touchdown, may be generally determined to be 20 seconds long. Using the inciting action time, the beginning of the play can be determined by identifying a time within the broadcast or media that is 20 seconds before the inciting action time.

The live personalized highlight creation system 202 can receive or retrieve metadata associated with the event at block 614. At block 616, the live personalized highlight creation system can use the metadata to determine a characteristic of the highlight that begins at the action time.

To personalize the highlights shown to a user, the metadata can include personalization metadata that indicates characteristics a user wishes to be included in highlights. The personalized highlight creation system 202 can determine if the characteristics found within the highlight satisfy a criterion created using the personalized metadata at block 620.

At block 622, a media representation, such as an interaction element, could be generated for the highlight. An interaction element can be an element on a broadcast timeline that, when interacted with, can induce a user device to show the broadcast from the time indicated by the interaction element. The interaction element can be placed on the broadcast timeline at the action time. In some embodiments, the media representation can be a message that is created to provide a user with an update of a highlight. For example, a user could get a text message that indicates a turnover occurred at a certain time. The media representation can be displayed to the user at block 624. The routine 600 ends at block 626.

Embodiments of the disclosure can be described in view of the following clauses:

Clause 1. A method comprising:
identifying, using a first image analysis component of a plurality of image analysis components, a first highlight of a plurality of highlights of a highlight reel, wherein the highlight reel is associated with an event;
receiving association metadata from a first data store and personalized metadata from a second data store, wherein the association metadata is associated with the event and the personalized metadata is associated with a personal preference of a user;
determining a characteristic and an action of the first highlight using the association metadata, wherein the characteristic is associated with the event of the first highlight;
determining that the characteristic satisfies a criterion associated with the personalized metadata;
selecting an audio track from an audio data store based on one of the action, the event, or the personalized metadata, wherein the audio track is associated with an audio element;
aligning the action depicted in the first highlight with the audio element;
generating a media representation that includes the action aligned with the audio element; and
causing a user device to present the media representation.

Clause 2. The method of Clause 1, wherein determining that the characteristic satisfies the criterion further comprises determining that the characteristic is associated with an entity referenced by the criterion.

Clause 3. The method of any of Clauses 1 to 2, wherein generating the media representation further comprises combining the first highlight and a second highlight of the plurality of highlights of the highlight reel, wherein the second highlight satisfies the criterion.

Clause 4. The method of Clause 3, wherein generating the media representation further comprises:
identifying a transition clip associated with the event; and
combining the first highlight, the second highlight and the transition clip.

Clause 5. The method of any of Clauses 1 to 4, wherein selecting audio from an audio data store further comprises selecting a first audio and a second audio, wherein the second audio is a subset of audio data of the highlight.

Clause 6. The method of Clause 5, wherein generating the media representation further comprises:
identifying an action of the first highlight; and
aligning the first audio and the second audio with the first highlight, wherein the audio element of the first audio is aligned with the action and the second audio combines with the first audio from a first time to a second time within the first highlight.

Clause 7. A non-transitory computer-readable medium storing instructions that, when executed by a computing system within a cloud provider network, cause the computing system to perform operations comprising:
identifying, using a first image analysis component of a plurality of image analysis components, a first highlight of plurality of highlights of a highlight reel, wherein the highlight reel is associated with an event;
determining a characteristic and an action of the first highlight, wherein the characteristic is associated with the event of the first highlight;
determining that the characteristic satisfies a criterion associated with a preference of a user;
selecting audio from an audio data store based on one of the action, the event, or metadata, wherein the audio is associated with an audio element; and
causing a media representation to be generated based on the first highlight and the audio, wherein the characteristic of the first highlight is aligned with the audio element.

Clause 8. The non-transitory computer-readable medium of Clause 7, wherein the metadata includes association metadata received from a data store, wherein the association metadata is associated with the event.

Clause 9. The non-transitory computer-readable medium of any of Clauses 7 to 8, wherein the audio element is one of a beat, tempo, lyric, or dynamic.

Clause 10. The non-transitory computer-readable medium of any of Clauses 7 to 9, wherein the media representation is created according to a presentation type.

Clause 11. The non-transitory computer-readable medium of any of Clauses 7 to 10, wherein the instructions, when executed, further cause the computing system to perform operations comprising determining that the characteristic is associated with an entity referenced by the criterion.

Clause 12. The non-transitory computer-readable medium any of Clauses 7 to 11, wherein the instructions, when executed, further cause the computing system to perform operations comprising combining the first highlight and a second highlight of the plurality of highlights of the highlight reel, wherein the second highlight satisfies the criterion.

Clause 13. The non-transitory computer-readable medium of Clause 12, wherein the instructions, when executed, further cause the computing system to perform operations comprising identifying a transition clip associated with the event combining the first highlight, the second highlight and the transition clip.

Clause 14. The non-transitory computer-readable medium any of Clauses 7 to 13, wherein the instructions, when executed, further cause the computing system to perform operations comprising selecting a first audio and a second audio.

Clause 15. The non-transitory computer-readable medium of Clause 14, wherein the instructions, when executed, further cause the computing system to perform operations comprising:
identifying an action of the first highlight; and
aligning wherein generating the media representation includes aligning the first audio and the second audio with the first highlight, wherein the audio element of the first audio is aligned with the action and the second audio combines with the first audio from a first time to a second time within the first highlight.

Clause 16. An interactive broadcast system comprising:
a memory, wherein the memory is configured to store computer-executable instructions; and
one or more processors in communication with the memory, wherein the computer-executable instructions, when executed by the one or more processors, cause the one or more processors to:
receive a first highlight of a plurality of highlights of a highlight reel;
determine a characteristic and an action of the first highlight, wherein the characteristic is associated with an event of the first highlight;
determine that the characteristic satisfies a criterion associated with metadata from a user; and
cause a media representation to be generated based on the first highlight and audio.

Clause 17. The interactive broadcast system of Clause 16, wherein the computer-executable instructions, when executed, further cause the one or more processors to select an audio track from an audio data store for alignment with the first highlight, wherein the audio is selected based on network data that identifies popular music associated with the event.

Clause 18. The interactive broadcast system of any of Clauses 16 to 17, wherein the computer-executable instructions, when executed, further cause the one or more processors to compare the criterion with the action to determine that the characteristic is associated with an entity.

Clause 19. The interactive broadcast system of any of Clauses 16 to 18, wherein the computer-executable instructions, when executed, further cause the one or more processors to combine the first highlight and a second highlight of the plurality of highlights of the highlight reel, wherein the second highlight satisfies the criterion.

Clause 20. The interactive broadcast system of Clause 19, wherein the computer-executable instructions, when executed, further cause the one or more processors to identify a transition clip associated with the event combining the first highlight, the second highlight and the transition clip.

Clause 21. A method comprising:
receiving input media, wherein the input media is associated with an event and includes audio data, video data, and metadata, and wherein the input media begins at a first input media time;

identifying, using a first image analysis component of a plurality of image analysis components, an inciting action, wherein the inciting action is associated with the event;

determining an inciting action time associated with the inciting action, wherein the inciting action time is a second input media time after the first input media time;

identifying, using a second image analysis component of the plurality of image analysis components, an event time, wherein the event time is determined using a visual indicator of the video data, and wherein the event time is associated with a third input media time after the first input media time;

identifying, using the inciting action time and the event time, a fourth input media time between the second input media time and the third input media time;

receiving first metadata associated with the event;

determining a highlight based on the fourth input media time and the first metadata;

determining a characteristic of the highlight;

determining that the characteristic satisfies a criterion associated with the metadata;

generating, based on the highlight and the metadata, an interaction element, wherein the interaction element is associated with the fourth input media time; and causing a user device to present the interaction element.

Clause 22. The method of Clause 21, wherein the first image analysis component is a trained machine learning model, wherein the first image analysis component detects when action of the event begins.

Clause 23. The method of any of Clauses 21 to 22, wherein the second image analysis component is a trained multimodal model.

Clause 24. The method of Clause 23, wherein the interaction element causes the user device to display the event at the fourth input media time.

Clause 25. The method of any of Clauses 21 to 24, wherein identifying the fourth input media time further includes comparing the event at the second input media time and the event at the third input media time with the metadata to determine a beginning time of the highlight.

Clause 26. The method of any of Clauses 21 to 25, wherein the interaction element is generated with an indication of the highlight using the metadata to determine a highlight type.

Clause 27. A non-transitory computer-readable medium storing instructions that, when executed by a computing system within a cloud provider network, cause the computing system to perform operations comprising:

receiving input media, wherein the input media is associated with an event and includes audio data, video data, and metadata and wherein the input media begins at a first input media time;

identifying, using a first image analysis component of a plurality of image analysis components, an inciting action, wherein the inciting action is associated with the event;

determining an inciting action time associated with the inciting action, wherein the inciting action time is a second input media time after the first input media time;

identifying, using a second image analysis component of the plurality of image analysis components, an event time, wherein the event time is determined using a visual indictor of the video data, and wherein the event time is associated with a third input media time after the first input media time;

identifying using the inciting action time and the event time, a fourth input media time between the second input media time and the third input media time;

determining a highlight based on the fourth input media time and the metadata associated with the event;

generating, based on the highlight, a media representation, wherein the media representation is associated with the fourth input media time; and causing a user device to present the media representation.

Clause 28. The non-transitory computer-readable medium of Clause 27, wherein the media representation is an interaction element.

Clause 29. The non-transitory computer-readable medium of Clause 28, wherein the interaction element causes the user device to display the event at the fourth input media time upon received interaction with the interaction element.

Clause 30. The non-transitory computer-readable medium of any of Clauses 27 to 29, wherein the first image analysis component is a machine learning model trained to detect when action of the event begins.

Clause 31. The non-transitory computer-readable medium of any of Clauses 27 to 30, wherein the second image analysis component is a trained multimodal model.

Clause 32. The non-transitory computer-readable medium of any of Clauses 27 to 31, wherein the media representation is generated with an indication of the highlight using the metadata to determine a highlight type.

Clause 33. The non-transitory computer-readable medium of any of Clauses 27 to 32, wherein the instructions, when executed, further cause the computing system to perform operations comprising comparing the event at the second input media time and the event at the third input media time with the metadata to determine a beginning time of the highlight.

Clause 34. The non-transitory computer-readable medium of any of Clauses 27 to 33, wherein the instructions, when executed, further cause the computing system to perform operations comprising determining that the highlight satisfies a criterion associated with the metadata.

Clause 35. The non-transitory computer-readable medium of Clause 34, wherein the metadata comprises metadata associated with the event.

Clause 36. An interactive broadcast system comprising:

a memory, wherein the memory is configured to store computer-executable instructions; and one or more processors in communication with the memory, wherein the computer-executable instructions, when executed by the one or more processors, configure the one or more processors to perform operations including:

identifying an inciting action of input media, wherein the inciting action is associated with an event and an inciting action time that is a second input media time after a first input media time associated with a beginning of the input media;

identifying an event time, wherein the event time is determined using an indicator of the input media, and wherein the event time is associated with a third input media time after the first input media time;

identifying using the inciting action time and the event time, a fourth input media time between the second input media time and the third input media time; and determining a highlight based on the fourth input media time and metadata associated with the event.

Clause 37. The interactive broadcast system of Clause 36, wherein the instructions, when executed, further cause the computing system to perform operations comprising causing a user device to generate a media representation and present the media representation.

Clause 38. The interactive broadcast system of Clause 37, wherein the media representation is an interaction element.

Clause 39. The interactive broadcast system of Clause 38, wherein the interaction element causes the user device to display the event at the fourth input media time upon received interaction with the interaction element.

Clause 40. The interactive broadcast system of any of Clauses 36 to 39, wherein identifying the fourth input media time further includes comparing the event at the second input media time and the event at the third input media time with the metadata to determine a beginning time of the highlight.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements, or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method comprising:
   receiving input media, wherein the input media is associated with an event and includes audio data, video data, and metadata, and wherein the input media begins at a first input media time;
   identifying, using a first image analysis component of a plurality of image analysis components, an inciting action, wherein the inciting action is associated with the event;
   determining an inciting action time associated with the inciting action, wherein the inciting action time is a second input media time after the first input media time;
   identifying, using a second image analysis component of the plurality of image analysis components, an event time, wherein the event time is determined using a visual indicator of the video data, and wherein the event time is associated with a third input media time after the first input media time;
   identifying, using the inciting action time and the event time, a fourth input media time between the second input media time and the third input media time;
   receiving first metadata associated with the event;
   determining a highlight based on the fourth input media time and the first metadata;
   determining a characteristic of the highlight;
   determining that the characteristic satisfies a criterion associated with the metadata;
   generating, based on the highlight and the metadata, an interaction element, wherein the interaction element is associated with the fourth input media time; and
   causing a user device to present the interaction element.

2. The method of claim 1, wherein the first image analysis component is a trained machine learning model, wherein the first image analysis component detects when action of the event begins.

3. The method of claim 1, wherein the second image analysis component is a trained multimodal model.

4. The method of claim 3, wherein the interaction element causes the user device to display the event at the fourth input media time.

5. The method of claim 1, wherein identifying the fourth input media time further includes comparing the event at the second input media time and the event at the third input media time with the metadata to determine a beginning time of the highlight.

6. The method of claim 1, wherein the interaction element is generated with an indication of the highlight using the metadata to determine a highlight type.

7. A non-transitory computer-readable medium storing instructions that, when executed by a computing system within a cloud provider network, cause the computing system to perform operations comprising:
   receiving input media, wherein the input media is associated with an event and includes audio data, video data, and metadata and wherein the input media begins at a first input media time;
   identifying, using a first image analysis component of a plurality of image analysis components, an inciting action, wherein the inciting action is associated with the event;
   determining an inciting action time associated with the inciting action, wherein the inciting action time is a second input media time after the first input media time;
   identifying, using a second image analysis component of the plurality of image analysis components, an event time, wherein the event time is determined using a visual indictor of the video data, and wherein the event time is associated with a third input media time after the first input media time;
   identifying using the inciting action time and the event time, a fourth input media time between the second input media time and the third input media time;
   determining a highlight based on the fourth input media time and the metadata associated with the event;
   generating, based on the highlight, a media representation, wherein the media representation is associated with the fourth input media time; and
   causing a user device to present the media representation.

8. The non-transitory computer-readable medium of claim 7, wherein the media representation is an interaction element.

9. The non-transitory computer-readable medium of claim 8, wherein the interaction element causes the user device to display the event at the fourth input media time upon received interaction with the interaction element.

10. The non-transitory computer-readable medium of claim 7, wherein the first image analysis component is a machine learning model trained to detect when action of the event begins.

11. The non-transitory computer-readable medium of claim 7, wherein the second image analysis component is a trained multimodal model.

12. The non-transitory computer-readable medium of claim 7, wherein the media representation is generated with an indication of the highlight using the metadata to determine a highlight type.

13. The non-transitory computer-readable medium of claim 7, wherein the instructions, when executed, further cause the computing system to perform operations comprising comparing the event at the second input media time and the event at the third input media time with the metadata to determine a beginning time of the highlight.

14. The non-transitory computer-readable medium of claim 7, wherein the instructions, when executed, further cause the computing system to perform operations comprising determining that the highlight satisfies a criterion associated with the metadata.

15. The non-transitory computer-readable medium of claim 14, wherein the metadata comprises metadata associated with the event.

16. An interactive broadcast system comprising:
a memory, wherein the memory is configured to store computer-executable instructions; and
one or more processors in communication with the memory, wherein the computer-executable instructions, when executed by the one or more processors, configure the one or more processors to perform operations including:
identifying an inciting action of input media, wherein the inciting action is associated with an event and an inciting action time that is a second input media time after a first input media time associated with a beginning of the input media;
identifying an event time, wherein the event time is determined using an indicator of the input media, and wherein the event time is associated with a third input media time after the first input media time;
identifying using the inciting action time and the event time, a fourth input media time between the second input media time and the third input media time; and
determining a highlight based on the fourth input media time and metadata associated with the event.

17. The interactive broadcast system of claim 16, wherein the instructions, when executed, further cause the computing system to perform operations comprising causing a user device to generate a media representation and present the media representation.

18. The interactive broadcast system of claim 17, wherein the media representation is an interaction element.

19. The interactive broadcast system of claim 18, wherein the interaction element causes the user device to display the event at the fourth input media time upon received interaction with the interaction element.

20. The interactive broadcast system of claim 16, wherein identifying the fourth input media time further includes comparing the event at the second input media time and the event at the third input media time with the metadata to determine a beginning time of the highlight.

\* \* \* \* \*